United States Patent
Shooter et al.

(10) Patent No.: US 9,315,610 B2
(45) Date of Patent: Apr. 19, 2016

(54) DISPERSANTS FROM LINEAR POLYURETHANES

(75) Inventors: Andrew J. Shooter, Wilmslow (GB); Stuart N. Richards, Frodsham (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 335 days.

(21) Appl. No.: 12/990,538

(22) PCT Filed: May 21, 2009

(86) PCT No.: PCT/US2009/044760
§ 371 (c)(1), (2), (4) Date: Nov. 1, 2010

(87) PCT Pub. No.: WO2009/148836
PCT Pub. Date: Dec. 10, 2009

(65) Prior Publication Data
US 2011/0054075 A1  Mar. 3, 2011

Related U.S. Application Data

(60) Provisional application No. 61/057,367, filed on May 30, 2008.

(51) Int. Cl.
| | | |
|---|---|---|
| C08G 18/00 | (2006.01) | |
| C08G 18/32 | (2006.01) | |
| C08G 18/18 | (2006.01) | |
| C08G 18/28 | (2006.01) | |
| C08G 18/08 | (2006.01) | |

(52) U.S. Cl.
CPC ........ *C08G 18/3275* (2013.01); *C08G 18/0814* (2013.01); *C08G 18/0852* (2013.01); *C08G 18/18* (2013.01); *C08G 18/1825* (2013.01); *C08G 18/1866* (2013.01); *C08G 18/283* (2013.01); *C08G 18/284* (2013.01); *C08G 18/2865* (2013.01)

(58) Field of Classification Search
CPC ............... C08G 18/0814; C08G 18/18; C08G 18/1825; C08G 18/1866; C08G 18/283; C08G 18/284
USPC .............. 528/49, 71, 75, 76, 80, 85; 524/589, 524/590, 839, 871, 874, 875
See application file for complete search history.

(56) References Cited

U.S. PATENT DOCUMENTS

| | | | |
|---|---|---|---|
| 3,763,058 A | | 10/1973 | Oertel et al. |
| 4,617,341 A | * | 10/1986 | Laine et al. .................. 524/591 |
| 4,647,647 A | * | 3/1987 | Haubennestel et al. ........ 528/83 |
| 4,942,213 A | * | 7/1990 | Haubennestel et al. ........ 528/28 |
| 5,807,957 A | * | 9/1998 | Samour et al. .................. 528/49 |
| 5,891,578 A | | 4/1999 | Amirsakis |
| 6,939,938 B2 | * | 9/2005 | Benard et al. .................. 528/49 |
| 8,338,558 B2 | * | 12/2012 | Richards et al. ................ 528/49 |

FOREIGN PATENT DOCUMENTS

| | | | | |
|---|---|---|---|---|
| DE | | 284475 A5 * | 10/1983 | ............. C08G 18/08 |
| WO | WO 2006132910 A2 * | | 12/2006 | ............. C08G 18/08 |

OTHER PUBLICATIONS

Document N in English.*

* cited by examiner

*Primary Examiner* — Michael L Leonard
(74) *Attorney, Agent, or Firm* — Sam B. Laferty, Esq.; Teresan W. Gilbert, Esq.

(57) ABSTRACT

The present invention provides a non-aqueous composition containing a particulate solid, an organic medium and polyurethane dispersant with a substantially linear anchoring segment pendant tertiary amine group(s) from said anchoring segment and terminally attached solvent-solubilising terminal chains of a polyester, polyether, or polyacrylate including mixtures of such terminal chains.

12 Claims, 1 Drawing Sheet

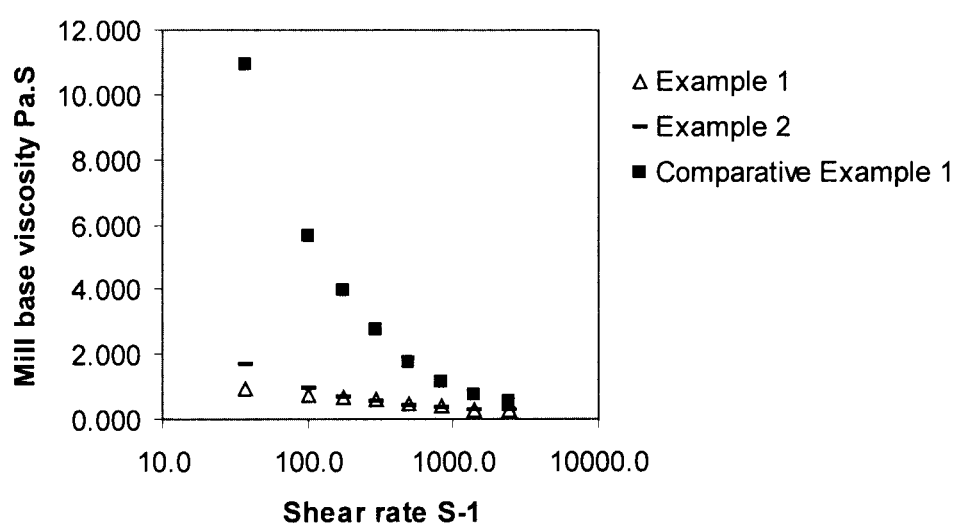

DISPERSANTS FROM LINEAR POLYURETHANES

CROSS REFERENCE TO RELATED APPLICATION

This application claims priority from PCT Application Ser. No. PCT/US2009/44760 filed on May 21, 2009, which claims the benefit of U.S. Provisional Application No. 61/057,367 filed on May 30, 2008.

FIELD OF INVENTION

The present invention relates to polyurethane dispersants and to dispersions, millbases, paints and inks containing particulate solid dispersed using said polyurethane dispersant in a non-aqueous organic medium. In particular, the polyurethane dispersant comprises an essentially linear anchoring portion having laterally attached tertiary amine groups (optionally quaternized) and terminally attached solvent-solubilising polyester, polyether, and/or polyacrylate chains.

BACKGROUND OF THE INVENTION

WO 2004/104064 discloses polyurethane dispersants of comb microstructure having an essentially linear backbone with laterally attached solvent-solubilising side chains of polyester, polyacrylic, polyether or polyolefin including mixtures of such side chains. A subsequent application WO 2008/070601 corresponding to PCT US07/086233 filed 3 Dec. 2007 and published about Jun. 12, 2008 teaches the corresponding comb microstructure polymers with tertiary and/or quaternized amine groups.

SUMMARY OF THE INVENTION

According to the invention, there is provided a non-aqueous composition comprising a particulate solid, an organic medium and a polyurethane dispersant having one or more essentially linear anchoring backbone segment(s) derived from difunctional urethane forming reactants with terminally attached solvent-solubilising terminal chains of polyester, polyether, and/or polyacrylate including mixtures of such terminal chains, and laterally attached group(s) with tertiary and/or quaternized tertiary amine on said anchoring backbone segment. In one embodiment, the nitrogen atom of the tertiary amine is desirable separated from the anchoring backbone by 1 to 20 intervening atoms. In one embodiment, the essentially linear anchoring backbone segment is formed by reaction diisocyanates with a compound having two groups reactive with isocyanate and a tertiary and/or quaternized amine group. In one embodiment, from about 50 to about 95 mole percent of all the isocyanate groups of said diisocyanates used to make the essentially linear anchoring backbone segment are reacted with said compound with two groups reactive with isocyanate groups and having a tertiary and/or quaternized tertiary amine group. The tertiary amine groups (optionally quaternized) have been found to be particularly active in anchoring the dispersant to some difficult to colloidally stabilize particulate materials. In one embodiment, significant portions of the tertiary amine groups are quaternized. The polyurethane dispersant is also described and claimed separate from the non-aqueous composition. A process for making the dispersant from named compound groups is also presented.

BRIEF DESCRIPTION OF THE DRAWING

FIG. 1 shows the determination of Mill Base Viscosity for Example 1, Example 2, and Comparative Example 1 as a function of shear rate $S^{-1}$.

DETAILED DESCRIPTION OF THE INVENTION

According to the invention, there is provided a non-aqueous composition comprising a particulate solid, an organic medium and a polyurethane (PU) dispersant having an essentially linear anchoring backbone structure with terminally attached solvent-solubilising chains (approximately two on average being preferred) of a polyester, polyether or polyacrylic including mixtures of such chains. The polyurethane dispersant also comprises tertiary aliphatic amine moieties where the amine nitrogen is remote from the anchoring backbone with a spacer of at least 1 atom between the nitrogen and the backbone atom(s). The tertiary amine moiety is optionally quaternized. The optimum choice of the solvent-solubilising side chain for a particular organic solvent medium will be dependent on the polarity of the organic medium. The choice of organic medium will depend on the preferred organic medium in which the particulate is to be dispersed.

The polyurethane dispersants may be prepared by any method known to the art and are obtainable or obtained by reacting together:

a) one or more diisocyanates having an average functionality of from about 2.0 to 2.5, in another embodiment from about 2.0 to about 2.1 or 2.2, and in a third embodiment about 2.0;

b) one or more compounds having a tertiary amino group of formula,

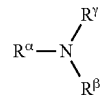

including salts thereof. $R^\alpha$ and $R^\beta$ are each independently alkyl, aralkyl, cycloalkyl or aryl and do not contain groups which can react with isocyanates. $R^\gamma$ is a moiety that contains two groups which react with isocyanates. In one embodiment, it is preferred that $R^\gamma$ contains from about 1.9 or 2.0 to 2.5, in another embodiment about 1.9 or 2 to 2.1 or 2.2 groups that react with isocyanates. It is especially preferred that $R^\gamma$ contains about/at least/or in another embodiment about 2.0 groups that react with isocyanates.

c) optionally, one or more urethane formative compounds having a number average molecular weight of from 32 to less than 500 Dalton which have two groups which react with isocyanates;

d) one or more solvent-solubilising polyester, polyether or polyacrylate chain comprising one group which reacts with isocyanates which is located near one end of the chain such that the polymer chain(s) such that after said group reacts with an isocyanate on the essentially linear anchoring backbone segment the solvent-solubilising chain is terminally disposed in relation to the anchoring polymer backbone; and e) optionally one or more solvent-solubilising chains having at least one polyester, polyether, or polyacrylate chain and about two groups, which react with isocyanates, which are located near each end of the solubilising chain such that the polyester, polyether, or polyacrylate (polyacrylic) chain can connect to two separate anchoring backbone segments connecting them. For the purposes of this application, it is desired that the isocyanate reactive groups of component (c) be near separate ends of the polymer rather than both at one end, to avoid component (e) functioning as a solubilising chain laterally attached to two essentially linear anchoring backbone segments where they are connected via component (e). Further, it is anticipated that component (e) may be a polyester or polyacrylate when component (d) is a polyether (similarly (e) may be a polyether or polyester when (d) is a polyacrylate) and (similarly when (d) is a polyester then (e) may be a polyacrylate or polyether).

An inert solvent may be added before, during or after formation of the anchoring polymer segment and/or the dispersant in order to control viscosity. Examples of suitable solvents are acetone, methylethylketone, dimethylformamide, dimethylacetamide, diglyme, N-methylpyrrolidone, butylacetate, methoxypropyl acetate, ethylacetate, ethylene and propylene glycol diacetates, alkyl ethers of ethylene and propylene glycol acetates, toluene and xylene. Preferred solvents are ethyl acetate, butyl acetate, methoxy propylacetate. Isocyanate reactive solvents may be added after the isocyanate reaction is complete, for example alcohols. Preferred alcohols are methanol, ethanol, propanol, butanol, hexanol and butoxyethanol. Especially preferred are butoxyethanol and propanol.

Component (c), if present, is used primarily as a chain extender for the anchoring segment to alter the solubility of the anchoring segment. In one embodiment, the dispersant contains none of component (C), In that embodiment, the anchoring segment consists essentially of the reaction product of components (a) and (b). In one embodiment, these can have a molecular weight between 32 to less than 500 Dalton and desirably have a functionality of isocyanate reactive groups of about 2 per molecule. These include diamines or diols. Examples of suitable diamines for component (c) are ethylene diamine 1 4-butane diamine and 1,6-hexane diamine. Examples of suitable diols for component (c) are 1,6-hexanediol, 1,4-cyclohexanedimethanol (CHDM), 1,2-dodecanediol, 2-phenyl-1,2-propanediol, 1,4-benzene dimethanol, 1,4-butanediol and neopentyl glycol. It is anticipated that for some pigments it may be desirable to incorporate some urethane formative component to alter the anchoring segment (i.e., the essentially linear anchoring backbone segment with laterally attached tertiary amine groups). For the purpose of this application, diols or (hairlines which fit the description of component (e) will not be considered to be a component (c) but rather a component (e) to avoid having any confusion.

These components are generally combined in various orders of addition under substantially anhydrous conditions and in an inert atmosphere which is typically a temperature between 0 and 130° C., optionally in the presence of an inert solvent and optionally in the presence of a catalyst. The inert atmosphere may be provided by any of the inert gases of the Periodic Table but is preferably nitrogen. Particularly preferred catalysts are tin complexes of aliphatic acids such as dibutyl tin dilaurate (DBTDL) and tertiary amines.

In one embodiment, component b) is quaternized before or after incorporation into the PU. In one embodiment, it is especially preferred that component b) is quaternized after, incorporation into the PU. The amount of quaternization is dependent on the amount needed on average to get good anchoring to the selected/preferred pigment or particulate. Inclusion of, the quaternized tertiary nitrogen atoms pendant from the essentially linear anchoring backbone in the polyurethane dispersant has been found to improve the colloidal stability of the dispersion of some particulate solids in organic liquids. In one embodiment, the amount of nitrogen in tertiary amine groups (optionally quaternized) in the polyurethane dispersant remote (also referred to as pendant or separated) from the linear backbone is preferably from about 1 to about 4 wt. %, more preferably from 1.5 to 3.5 wt. % and in embodiments where more than 50 mole % is quaternized, and from about 1.5 to 2.5 wt. % and in embodiments where less than 50 mole % is quaternized from about 2.5 to about 3.5 wt. % based on the weight of the essentially linear anchoring backbone segment. The polyurethane dispersant may also optionally contain other tertiary amine groups which are incorporated in the linear anchoring backbone but these were not intended to be counted towards the above specified amounts of nitrogen atoms in tertiary amine groups.

The tertiary amine may be quaternized with any known quaternizing agent. Preferred quaternizing agents are alkyl halides, aralkyl halides, dialkyl carbonates, dialkyl sulphates or epoxides. Particularly preferred quaternizing agents are dimethyl sulphate, benzyl chloride or styrene oxide. It is preferred that the tertiary amine groups within the anchoring segment are quaternized to some extent, In one embodiment, the extent of quaterinzation of the tertiary amine group, pendant (e.g., separated or remote) from the anchoring segment and/or polyurethane dispersant is >10%, in another embodiment >20 or >30%, and in more preferred embodiments for some pigments the extent of quaternization is >45 or >60% and most preferred that it is >80% on a mole basis of the remote tertiary amine groups.

In one embodiment, it is preferred that $R^\gamma$ contains on average 2 groups that react with isocyanates.

An acid may be added to form a salt with the tertiary amine moiety in component b).

In one embodiment, the non-aqueous composition optionally contains 5 wt % or less water, preferably less than 2 wt. %, more preferably less than 0.5 wt. % and most, preferably no water based on the total weight of all solvents in the composition.

Preferably, component (a) is a diisocyanate or mixtures of diisocyanates such as toluene diisocyanate (TDI), isophorone diisocyanate (IPDI), hexanediisocyanate (HDI), α,α-tetramethylxylene diisocyanate (TMXDI), diphenylmethane-4,4'-diisocyanate (4,4'-MDI), diphenylmethane-2,4'-diisocyanate (2,4'-MDI) and dicyclohexylmethane-4,4'-diisocyanate (HMDI). Preferably, component (a) is either TDI or IPDI or MDI. TDI is especially preferred.

The mole % isocyanate groups of component a) reacted with isocyanate reactive groups of component (b) in one embodiment is desirably about 5 to 95 mole %, in another embodiment from 50-95%, and in another embodiment 75-95% and even more preferably 80-95%. The residual isocyanate groups will generally be reacted with a urethane formative component (c) or with solvent-solubilising chains (d) and/or optional component (e). In one embodiment, the NCO:OH ratio is allowed to go above 1:1, since it is conventional in urethane chemistry to use an excess of isocyanate in case some of the active isocyanate groups are consumed or converted to other groups such as groups reactive with isocyanate by reactions with adventitious water in reactor systems.

The structure of component b) is such that when it is incorporated into the polyurethane through reaction with isocyanates a tertiary amine group derived from component b) is laterally attached to the anchoring backbone such that the tertiary nitrogen atom is separated by at least one atom from the closest atom on the backbone of the essentially linear anchoring backbone segment. It is more preferred that the tertiary nitrogen atom is separated by at least two atoms from the closest atom on the backbone and especially preferred that the tertiary nitrogen atom is separated by at least 3 atoms from the closest atom on the backbone. It is preferred the tertiary nitrogen atom, is separated by less than 20 atoms from the closest atom on the backbone. It is more preferred the tertiary nitrogen atom is separated by less than 15 atoms from the closest atom on the backbone. It is especially preferred the tertiary nitrogen atom is separated by less than 10 atoms from the closest atom on the backbone. Such tertiary amines laterally attached are thought to provide better anchoring to some particulate solids. The tertiary amine may also be partially or fully quaternized to form a quaternary ammonium salt. In one embodiment, it is desirable that most e.g., at least 80, at least 85, at least 90 or at least 95 mole % of the groups (reactive with isocyanates) of component b) are reacted with isocyanate groups to form the essentially linear anchoring backbone segment. For the purpose of this application, a backbone atom is considered to be the atoms of a polymer that form a continuous interconnected chain of atoms between the first atom of the first repeating unit and the last atom of the last repeating unit. Atoms pendant from the backbone such as the methyl group in TDI or $CH_3$ in poly(1,2-propylene oxide) will not be considered backbone atoms, but rather will be called pendant moieties. For the purpose of this application backbone segment (especially when, referring to the molecular weight of the backbone or backbone segment) will be interpreted to include not only backbone atoms, but also atoms and lateral structures/moieties pendant from the backbone atoms. For the purposes of this application and claims, the use of the term "essentially linear" to described the anchoring segment will be interpreted to mean that the components (a), (b), and optionally (c) forming the anchoring segment, are generally all difunctional reactants such that polymer branching from trifunctional or higher functionality reactants in the anchoring segment is not present in any significant percentage. The presence of laterally attached tertiary nitrogen atoms in small pendant groups is desirable and does not negate from the term "essentially linear".

Examples of component (b) are: Products formed from the Michael addition of dialkylaminoalkylamines to an α,β-unsaturated carbonyl compound containing a hydroxy functionality. Some examples of suitable dialkylaminoalkylamines may be represented by the formula $R^1(R^2)NR^3NH_2$ where $R^1$ and $R^2$ are independently $C_1$-$C_6$ alkyl moieties. $R^1$ and $R^2$ may be taken together to form a cyclic structure containing 5 to 8 carbon atoms. $R^3$ is $C_1$ to $C_{12}$ linear or branched alkylene. Examples of suitable α,β-unsaturated carbonyl compound containing a hydroxy functionality include hydroxyalkyl acrylates such as hydroxyethyl acrylate, hydroxypropyl acrylate or hydroxybutyl acrylate. A preferred example of component c) is 2-hydroxyethyl 3-{[3-(dimethylamino)propyl]amino}propanoate (compound Z) formed by the reaction of dimethylaminopropylamine with 2-hydroxyethyl acrylate as illustrated below.

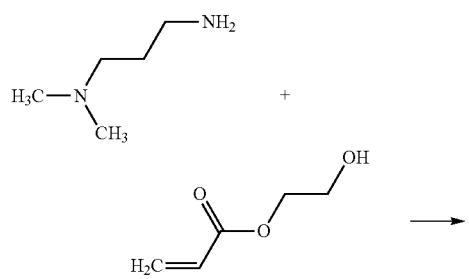

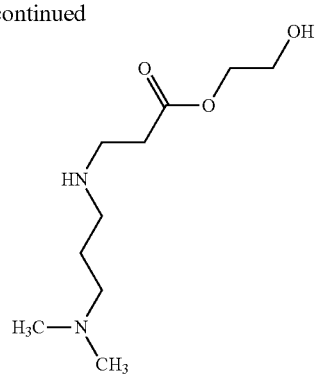

compound Z 1,1'-{[3-(dimethylamino)-propyl]imino}bis-2-propanol

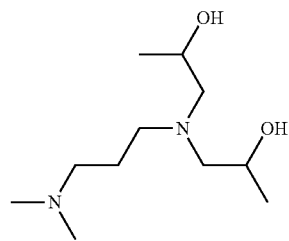

Diethylamino-1,2-propanediol

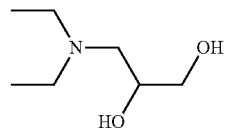

The Michael addition product of a dialkylaminoalkyl acrylate with an amino alcohol. Examples of dialkylaminoalkyl acrylates include dimethylaminoethyl acrylate, dimethylaminopropyl acrylate, diethylaminoethyl acrylate and diethylaminopropyl acrylate. The Michael addition is illustrated in the following reaction scheme using dimethylaminoethyl acrylate and an amino alcohol.

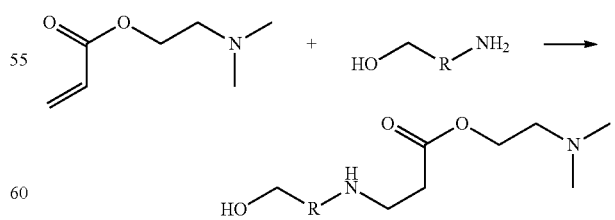

Examples of amino alcohols include C1-C12 alkanolamines where $R=(CH_2)_n$ and $0 \leq n \leq 11$ or aminoethoxyethanol where $R=CH_2OCH_2CH_2$. 2,2-Bis(diethylamino)methyl)-1,3-propanediol which is an example which would yield 2 pendant tertiary nitrogens in the polyurethane.

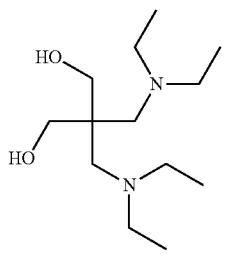

Compounds obtainable or obtained by the Michael addition reaction of two moles of a dialkylaminoalkylamine with one mole of an unsaturated compound of the formula 5 as described above.

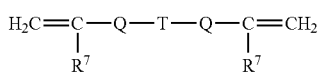

wherein Q, T and $R^7$ are as defined hereinbefore. Examples of unsaturated compounds of Formula 5 are especially diacrylates wherein T is a $C_{4-10}$-alkylene residue, a polyoxyalkylene residue or an oxyethylated Bisphenol A residue.

Component (d) is a polyether, polyester or polyacrylate which contains about one group that reacts with isocyanates. Preferable, the group is located at the chain end of the polymer. Preferably, the group is a hydroxyl or amine group, more preferably a hydroxyl group. These groups that react with isocyanates are also referred to as groups With a Zerewitinoff hydrogen. Zerewitinoff hydrogen in urethane chemistry are known to exist on OH, SH, <NH, and $NH_2$. For the purposes of this application, we are interested in the hydroxyl and amine groups that are reactive with isocyanates. The preferred number average molecular weights of the polyether, polyester or polyacrylate are 500-20,000, more preferable 500-10,000 and most preferably 500-5000 Dalton. Even more preferably 1000-4000 molecular weight. In order to control the structure of the dispersant, it is desirable that component (d) only has on average one group that reacts with the isocyanates under the reaction conditions used to form the dispersant (linear anchoring segments). Having only one isocyanate reactive group per each component (d) promotes the component (d) being a terminal solubilising group from the anchoring segment rather than a chain extender between two linear anchoring segments.

Component (e) is a solvent-solubilising polyether, polyester or polyacrylate chain or mixtures thereof which contains about two groups, which reacts with isocyanates. Preferable, the groups are located near the chain ends of the polymer. Preferably, the groups are a hydroxyl and/or amine group, more preferably a hydroxyl group. When component (c) is a diol, may also be a polyether such as a poly ($C_{2-4}$-alkylene glycol), a polyester or polyacrylate diol. The polyalkylene glycol may be a random or block (co)polymer containing repeat ethyleneoxy, propyleneoxy or butyleneoxy groups, including mixtures thereof. In situations where the dial or diamine is a solubilising poly($C_{2-4}$alkylenene glycol), a polyester, or a polyacrylic diol, the polyurethane dispersant comprises two or more essentially linear anchoring backbone segments chain extended with one or more difunctional solvent-solubilising chains (e). The preferred number average molecular weights of the polyether, polyester or polyacrylate are 500-20,000, more preferable 500-10,000 and most preferably 500-5000. Even more preferably 1000-4000 Dalton molecular weight.

In order to control the structure of the dispersant, it is desirable that component (e) only has on average two groups that reacts with the isocyanates under the reaction conditions used to form the dispersant (linear anchoring segments). Having two isocyanate reactive group per each component (e) allows component (e) to function as a chain extender between two linear anchoring segments. Component e) is only present in embodiments where two or more linear anchoring backbone segments are desired. At this time, it is not anticipated to use component e) when the intended product has only a single anchoring backbone segment and two terminal solubilising chain ends.

In one embodiment where the terminal solubilising chain (d) and/or component (e) is a polyacrylate (sometimes referred to as polyacrylic), it is preferably obtained from the polymerisation of an alkyl acrylate or alkyl methacrylate. The poly alkyl(meth)acrylate may be prepared by the free radical polymerisation of (meth) acrylate monomer(s). Component (d) may be prepared in the presence of a monohydroxyl functional chain transfer agent for example mercaptoalcohols to impart mono-functionality. Other vinyl monomers such as styrene, vinyl esters, etc., could be copolymerized into the polyacrylate provided that they do not significantly negatively affect solubility in the selected solvent system for the dispersant or interact negatively with the tertiary and/or quaternized tertiary amines. In one embodiment, the non-acrylate monomers are less than 30, less than 20 and less than 10 mole percent of the total repeating units of the polyacrylate. Preferably, the mercaptoalcohols include 2-mercaptoethanol, 1-mercapto-2-propanol, 3-mercapto-1-propanol 1-mercapto-2-propanol 4-mercapto-1-butanol, 6-mercapto-1-hexanol, 4-mercaptophenol. Preferably, the polymerisation can be performed in the presence of a non-functional radical initiator, for example, azo type initiators, Examples of suitable azo initiators include 2,2'-azobis(4-methoxy-2,4-dimethylvaleronitrile), 2,2'-azobis(2,4-dimethyl-valeronitrile, 2,2'-azobisisobutyronitrile, dimethyl 2,2'-azobisisobutyrate, 2,2'-azobis(2-methyl-butyronitrile), 1,1'-azobis(1-cyclohexanecarbonitrile), 2-(carbamoylazo)-isobutyronitrile, 2,2'-azobis(2,4,4-trimethyl-pentane. The preferred initiators are 2,2'-azobisisobutyronitrile, and 1,1'-azobis(1-cyclohexanecarbonitrile). To obtain a higher hydroxyl content polymer, a mercaptoalcohol can be used in the presence of a hydroxyfunctional initiator, for example, 2,2'-azobis[2-methyl-N-(2-hydroxyethyl) propionamide].

Alternatively, the poly alkyl(meth)acrylate may be prepared by any polymerisation technique such as Ionic Polymerisation, Group Transfer Polymerisation (GTP), Atom Transfer Radical Polymerisation (ATRP), Nitroxide Mediated Radical Polymerisation (NMRP) or Radical Addition Fragmentation Polymerisation (RAFT) using a functional initiator or chain terminator that has one group reactive with isocyanates, for example, hydroxyl functional RAFT agents. RAFT agents are disclosed in numerous publications such as WO 2006/020281 and U.S. Pat. No. 7,279,591.

Isocyanate reactive functionality may be introduced into the polyacrylate solubilising chain (either component (d) or (e)) before or after the polymerisation of the poly(meth)acrylate.

The total weight percentage of the solvent-soluble (solubilising) terminal chains of component (d) (e.g., polyether, polyester, and/or polyacrylate) in the polyurethane dispersant in one embodiment is preferably not less than 5%, in another embodiment not less than 20%, more preferably not less than 30% and especially not less than 40% by weight of the polyurethane dispersant. It is also preferred that the total weight percentage of solvent-soluble terminal chains in the polyurethane dispersant is not greater than 80%, more preferably not greater than 70%, especially not greater than 60% based on the weight of the dispersant. In one embodiment, the total weight percentage of solvent-soluble terminal chains in the polyurethane dispersant is not greater than 60%, for instance 40% to 60%. The weight percentages above are not meant to include solubilising chains characterized as component (e).

The polyurethane polymers according to the invention may be prepared by any method known to the art. Typically, the polyurethane dispersant is obtainable or obtained by reacting one or more diisocyanates component (a) with one or more compounds selected from (b), component (d) and optional components (c) and (e). In one embodiment, the monofunctional solvent-solubilising polyether, polyester or polyacrylic chain (d) is introduced at the start of the polyurethane synthesis with (a), (b) and optionally (c) and (e). In another embodiment, component (d) and optionally (e) are introduced after (a), (b) and optionally (c) have been polymerised.

The number average molecular weight of the polyurethane dispersant is preferably not less than 2,000, more preferably not less than 3,000 and especially not less than 4,000. It is also preferred that the number average molecular weight of the polyurethane polymer is not greater than 30,000, more preferably not greater than 20,000 and especially not greater than 15,000 Dalton.

Whereas, the solvent-solubilising polyester, polyether, or polyacrylate terminal chains of component (d) may contain a second terminal group less reactive with isocyanates than the coupling terminal group, it is much preferred that such terminal solubilising chains carry one terminating group which is not reactive with isocyanates and especially a $C_{1-50}$-hydrocarbyl group since this restricts any cross-linking during the preparation of the dispersant. The hydrocarbyl group may be optionally branched alkyl, cycloalkyl, aryl or aralkyl.

The cycloalkyl group is preferably $C_{3-6}$-cycloalkyl such as cyclopropyl and especially cyclohexyl. The aryl group is preferably $C_{6-10}$-aryl such as naphthyl and especially phenyl which may be substituted by halogen, $C_{1-20}$-alkyl or $C_{1-20}$-alkoxy. The aralkyl group is preferably 2-phenylethyl and especially benzyl where the phenyl ring is optionally substituted by halogen, $C_{1-20}$-alkyl or $C_{1-20}$-alkoxy.

The length of the alkyl terminating group of the polyester, polyether, and/or polyacrylate chain depends to a large extent on the nature of the organic medium. Thus, for example, when the organic medium is polar organic liquid, the hydrocarbyl group is preferably $C_{1-12}$ alkyl which may be linear or branched. The hydrocarbyl group includes ethyl, propyl, isopropyl or mixtures thereof. When the polyurethane dispersant contains polyether terminal chains, it is preferred that the terminating alkyl group is $C_{1-4}$ alkyl, for instance methyl, because of their ready commercial availability. When the organic medium is a non-polar organic liquid, it is preferred that the terminating alkyl group contains greater than 8 carbon atoms. It is also preferred that the alkyl group is branched since this aids solubility in the non-polar organic liquid.

In one embodiment, the solvent-solubilising chain of component (d) is a polyether chain, preferably poly($C_{2-4}$-alkylene oxide) which contains less than 60%, more preferably less than 40%, and especially less than 20% by weight ethylene oxide relative to the total weight of the poly ($C_{2-4}$-alkylene oxide) chain. The alkylene moiety of the ($C_{2-4}$-alkylene oxide) group may be linear or preferably branched and may be obtained by (co)polymerisation of alkylene oxides such as ethylene oxide, propylene oxide and butylene oxide or from tetrahydrofuran. Copolymers may be random or block copolymers. Preferably, the polyether chain is obtainable from propylene oxide. It is also preferred that the polyether chain of the dispersant is obtainable from a poly($C_{2-4}$-alkylene oxide) mono-$C_{1-10}$-alkyl ether and especially a $C_{1-4}$ alkyl ether such as methyl or butyl ether.

In one embodiment where a component (e) is present. In another embodiment, optional component (e) is absent. When component (e) is a polyether chain (characterized similarly to component (d) polyethers) except with about 2 groups reactive with isocyanates, the polyether chain for component (e) can be prepared from $C_2$-$C_4$ alkylene oxide monomers added to both ends of a difunctional initiator such as a $C_1$-$C_{20}$ diol. This would prepare a diol with $C_2$-$C_4$ alkylene oxide repeating units.

In one embodiment, the solvent solubilising chain of component (d) is a polyester. The polyester chain of component (d) is preferably obtainable or obtained from a hydroxy carboxylic acid containing from 1 to 26 carbon atoms or a lactone thereof. The choice of hydroxy carboxylic acid is largely influenced by the nature of the organic medium itself. Where the organic medium is a polar organic liquid, the hydroxy carboxylic acid preferably contains up to 8 carbon atoms, and where the organic medium is a non-polar organic liquid, the hydroxy carboxylic acid preferably contains more than 8 carbon atoms. It is particularly preferred that the polyester chain is obtainable from two or more different hydroxy carboxylic acids or lactones thereof since this aids solubility in the organic medium. The hydroxy carboxylic acid may be saturated or unsaturated, linear or branched. When component (e) is present and comprises a polyester chain, it is made from similar components as polyester chain (d). Of course polyester chains of component (e) are functionalized with two isocyanate reactive groups.

Examples of suitable hydroxy carboxylic acids are glycolic acid, lactic. acid, 5-hydroxy valeric acid, 6-hydroxy caproic acid, ricinoleic acid, 12-hydroxy stearic acid, 12-hydroxydodecanoic acid, 5-hydroxydodecanoic acid, 5-hydroxydecanoic acid and 4-hydroxydecanoic acid, Examples of suitable lactones are β-propiolactone and optionally $C_{1-6}$-alkyl substituted δ-valerolactone and ϵ-caprolactone such as β-methyl-δ-valerolactone, δ-valerolactone, ϵ-caprolactone, 2-methyl, 3-methyl, 4-methyl, 5-tert butyl, 7-methyl-4,4,6-trimethyl- and 4,6,6-triniethyl-ϵ-caprolactone, including mixtures thereof. Polyester chains derivable from δ-valerolactone and/or ϵ-caprolactone are especially preferred.

By way of an obvious variant, the solvent-solubilising polyester or polyether terminal chains may themselves be mixtures of such chains. Thus, for example, the polyester side chains may contain a polyether moiety and vice-versa.

As disclosed hereinbefore, the backbone of the anchoring segment is essentially or substantially linear. By this we mean that the reactive components to make the anchoring segment are mostly difunctional and have very little trifunctional or higher functionality reactants that might cause polymer branching if fully reacted. Therefore, the isocyanates of component (a) from which the dispersant is obtainable preferably have average functionality of from 2.0 to 2.5, more preferably from 2.0 to 2.1 and especially approximately 2.0. Similarly, the component (b) and optional components (e) and (e) in one embodiment preferably individually and/or combined have a functionality of groups reactive with isocyanates from 1.9 or 2.0 to 2.5, more preferably from 1.95 or 2.0 to 2.1 or 2.2 and especially 2.0.

In one embodiment, the solvent-solubilising terminal polyester, polyether, and/or polyacrylate chains are sometimes connected to anchoring backbone by oxygen and/or nitrogen atoms which are the residue of terminating hydroxy and amino (primary and secondary) groups of the polyester, polyether and/or polyacrylate that are reacted with terminal isocyanate groups of the essentially linear anchoring segment.

The particulate solid present in the composition may be any inorganic or organic solid material which is substantially insoluble in the organic medium at the temperature concerned and which it is desired to stabilise in a finely divided form therein.

Examples of suitable solids are pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate Ceramic materials; magnetic materials and magnetic recording media, fire retardants such as those used in plastics materials and biocides, agrochemicals and pharmaceuticals which are applied as dispersions in organic media.

A preferred particulate solid is a pigment from any of the recognised classes of pigments described, for example, in the Third Edition of the Colour Index (1971) and subsequent revisions of and supplements thereto, under the chapter headed "Pigments". Examples of inorganic pigments are titanium dioxide, zinc oxide, and iron oxides.

Examples of organic pigments are those from the azo, disazo, condensed azo, thioindigo, indanthrone, isoindanthrone, anthanthrone, anthraquinone, isodibenzanthrone, triphendioxazine, quinacridone, perylene, diketopyrrolopyrrol (DPP), and phthalocyanine series, especially copper phthalocyanine and its nuclear halogenated derivatives, and also lakes of acid. basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, anthraquinones, quinacridones, perylene, diketopyrrolopyrrol (DPP), and carbon blacks.

Pigments with an acidic surface are preferred such as oxidized carbon blacks.

Other preferred particulate solids are: extenders and fillers such as talc, kaolin, silica, barites, nanoclays, and chalk; particulate ceramic materials such as alumina, aluminium oxide, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; agrochemicals such as the fungicides flutriafen, carbendazim, chlorothalonil and mancozeb and fire retardants such as aluminium trihydrate and magnesium hydroxide.

The dispersant and pigment/particulate may eventually be used with an organic media, that may or may not be similar to the medium used to form the dispersant, to form a millbase, a coating material, an ink, or other useful blend. The organic medium present in the composition is preferably a polar organic medium or a substantially non-polar aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al., in Journal of Paint Technology, Vol. 38, 1966, at page 269. Such organic media generally have a hydrogen bonding number of 5 or more as defined in the above mentioned article.

Examples of suitable polar organic liquids are amines, ethers, especially lower alkyl ethers, organic acids, esters, ketones, glycols, glycol ethers, glycol esters, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14, on pages 39-40, and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids, there may be mentioned dialkyl and cycloalkyl ketones, such as acetone, methyl ethyl ketone, diethyl ketone, di-isopropyl ketone, methyl isobutyl ketone, di-isobutyl ketone, methyl, isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, aliphatic hydrocarbons such as hexane, heptane, octane, decane, petroleum distillates such as white spirit, mineral oils, vegetable oils and halogenated aliphatic and aromatic hydrocarbons, such as trichloro-ethylene, perchloroethylene and chlorobenzene.

The dispersant and pigment/particulate may eventually be blended with a resin to form a millbase, a coating material, an ink, or other useful blend. Examples of suitable polar resins, as the medium for the dispersion form of the present invention, are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl, cellulose. Examples of paint resins include short oil alkyd/melamine-formaldehyde, polyester/melamine-formaldehyde, thermosetting acrylic/melamine-formaldehyde, long oil alkyd and multi-media resins such as acrylic and urea/aldehyde.

The resin may also he an unsaturated polyester resin including the so-called sheet moulding compounds and bulk moulding compounds which may be formulated with reinforcing fibres and fillers. Such moulding compounds are described in DE 3,643,007 and the monograph by P. F. Bruins entitled "Unsaturated Polyester Technology", Gordon and Breach Science publishers, 1976, pages 211 to 238.

If desired, the dispersions may contain other ingredients, for example, resins (where these do not already constitute the organic medium) binders, fluidising agents (such as those described in GB-A-1508576 and GB-A-2108143), anti-sedimentation agents, plasticizers, levelling agents and preservatives.

The composition typically contains from 5 to 95% by weight of the particulate solid, the precise quantity depending on the nature of the solid and the relative densities of the solid and the organic medium. For example, a composition in which the solid is an organic material, such as an organic pigment, preferably contains from 15 to 60% by weight of the solid whereas a composition m which the solid is an inorganic material, such as an inorganic pigment, filler or extender, preferably contains from 40 to 90% by weight of the solid based on the total weight of composition.

The composition is preferably prepared by milling the particulate solid in the organic medium at a temperature which is not greater than 40° C. and especially not greater than 30° C., However, when the solid is a crude phthalocyanine pigment such as copper phthalocyanine, it is sometimes preferable to carry out the milling in an organic liquid at a temperature between 50 and 150° C. since greener and brighter shades may be obtained. This is particularly the case where the organic liquid is a high boiling aliphatic and/or aromatic distillate.

The composition may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example, by ball milling, bead milling, gravel milling or plastic milling until the dispersion is formed. Alternatively, the solid may be treated to reduce its particle size independently or in admixture with either of the organic medium or the dispersant, the other ingredient or ingredients then being added and the mixture being agitated to provide the dispersion.

If the composition is required in dry form, the liquid medium is preferably volatile, so that it may be readily removed from the particulate solid by a simple separation means such as evaporation. It is preferred, however, that the composition comprises the liquid medium.

If the dry composition consists essentially of the dispersant and the particulate solid, in one embodiment, it preferably contains at least 0.2%, more preferably at least 0.5% and especially at least 1.0% dispersant based on weight of the particulate solid. In one embodiment, the dry composition contains not greater than 100%, preferably not greater than 50%, more preferably not greater than 20%, and especially not greater than 10% by weight dispersant based on the weight of the particulate solid.

As described hereinbefore, the compositions are particularly suitable for preparing mill-bases where the particulate solid is milled in a liquid medium in the presence of both a particulate solid and a film-forming resin binder.

Thus, according to a still further aspect of the invention there is provided a mill-base comprising a particulate solid, dispersant and a film-forming resin.

Typically, the mill-base contains from 20 to 70% by weight particulate solid based on the total weight of the mill-base. Preferably, the particulate solid is not less than 30 and especially not less than 50% by weight of the mill-base.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of dispersant in the mill-base is dependent on the amount of particulate solid but is preferably from 0.5 to 5% by weight of the mill-base.

In one embodiment, the polyurethane dispersant according to the invention is that it comprises a predominantly linear anchoring polymer backbone containing the defined amount of laterally attached tertiary or quaternized tertiary amino groups and about two terminal solvent-solubilising chains of poly (alkylene oxide), polyester, poly(alk)acrylate or polyolefin. In one embodiment, there are chain extending solvent-solubilising chains that connect essentially linear anchoring segments to each other. There will thus be many variants which will be obvious to the skilled addressee regarding the ratio of isocyanate groups to isocyanate reactive groups.

As noted hereinbefore, some of the polyurethane dispersants are novel. Hence, as a further aspect of the invention, there is provided -a polyurethane dispersant having an essentially linear anchoring backbone containing the defined amount of laterally attached tertiary or quaternized tertiary amino groups and terminally attached solvent-solubilising chains from polyether side chains of poly($C_{2-4}$-alkylene oxide) which contains less than 60% by weight ethylene oxide relative to the poly($C_{2-4}$-alkylene oxide) chain.

As a still further aspect of the invention, there is provided a polyurethane dispersant having an essentially linear anchoring backbone and terminally attached solvent-solubilising polyester and/or polyacrylate chains.

INDUSTRIAL APPLICATION

Dispersions and mill bases made from the composition of the invention are particularly suitable for use in paints, including high solids paints, inks, especially flexographic, gravure and screen inks, colour filter layers for display screen equipment and non-aqueous ceramic processes.

The following examples provide an illustration of the invention. These examples are non exhaustive and are not intended to limit the scope of the invention. Unless expressed to the contrary, all references are to parts by weight.

All polymerisation were characterised by size exclusion chromatography using a Waters 2690 Separations module with Polymer Laboratories mixed d columns and THF eluent with 1% triethyl amine. The molecular weights have been compared to polystyrene standards. Solids contents have been determined by gravimetry.

Intermediate A Monohydroxy Poly(Butyl Methacrylate)

Butyl methacrylate (369 parts), methoxy propyl acetate (369 parts) and 2-mercaptoethanol (9.21 parts) were stirred together in a RB flask and heated to 90° C. under nitrogen. Azobis(cyclohexane-1-carbonitrile) (3.69 parts) was then charged and the reaction vessel maintained at 90° C. for 20 hrs. After cooling, the resulting polymer was a liquid with solids content of 50.6%. The product was characterised by size exclusion chromatography and had Mn=2900 and Mw=6200. This is Intermediate A.

Intermediate B Monohydroxy Polycaprolactone

1-Dodecanol (13.2 parts) and ε-caprolactone (200 parts) were stirred together under nitrogen at 150° C. Zirconium butoxide catalyst (1.1 parts) was added and the reactants were heated to 180° C. and stirring maintained for 20 hours. After cooling to 20° C., the resulting polyester was obtained as a waxy solid. This is Intermediate B.

Example Dispersant 1 With Poly(Butyl Methacrylate) Solubilising Segment

Intermediate A (poly(butyl methacrylate)) (100 parts), 1,1'-{[3-(dimethylamino)-propyl]imino}bis-2-propanol (15.42 parts), methoxy propyl acetate (29.09 parts) were stirred together in a RB flask and heated to 70° C. under nitrogen. Toluene diisocyanate (13.67 parts) was then charged over 15 minutes and the temperature maintained at 70° C. for 2 hrs until no isocyanate remained. 95.68 parts of the resulting solution were removed from the reaction vessel. The product was characterized by size exclusion chromatography and gave molecular weight values of Mn=5000 and Mw=9600. Benzyl chloride (1.61 parts) was charged to the residual solution (62.5 parts) which was held at 70° C. for 20 hrs with agitation to yield a quaternized PU (polyurethane) dispersant with solids content 52.5%.

Example Dispersant 2 With Polycaprolactone Solubilising Segment

Intermediate B (poly(caprolactone)) (61.23 parts), 1,1'-{[3-(dimethylamino)-propyl]imino}bis-2-propanol (20.05 parts), methoxy propyl acetate (99.08 parts) were stiffed together in a RB flask and heated to 70° C. under nitrogen. Toluene diisocyanate (17.71 parts) was then charged over 15 minutes and the temperature maintained at 70° C. for 2 hrs until no isocyanate remained. The product was characterized by size exclusion chromatography and gave molecular weight values of Mn=6500 and Mw=15400. Benzyl chloride (10.46 parts) and methoxy propyl acetate (10.46 parts) were charged to the residual solution (198.16 parts) which was held at 70° C. for 20 hrs with agitation to yield a quaternized PU dispersant with solids content 50%.

Comparative Example A With Polycaprolactone Solubilising Segment and No Pendant Tertiary or Quaternized Amine Intermediate B (poly(caprolactone)) (70.65 parts), N-Methyldiethanaolamine (12.63 parts), methoxy propyl acetate (103.79 parts) were stirred together in a RB flask and heated to 70° C. under nitrogen. Toluene diisocyanate (20.51 parts) was then charged over 15 minutes and the temperature maintained at 70° C. for 2 hrs until no isocyanate, remained. The product was characterized by size exclusion chromatography and gave molecular weight values of Mn=8200 and Mw=18900. Benzyl chloride (12.06 parts) and methoxy propyl acetate (12.06 parts) was charged to the residual solution (207.58 parts) which was held at 70° C. for 20 hrs with agitation to yield a quaternized PU dispersant with solids content 42.8%.

Dispersions were prepared by separately dissolving example dispersants 1 and 2 and comparative dispersant example A (2.89 parts at 50% active) in butyl acetate (11.95 parts). Macrynal SMC565 (10.05 parts ex Cytec) and 3 mm glass beads (125 parts) and red pigment (7.23 parts, Cromopthal Red A3B ex Ciba) were added and the, contents were milled on a scandex shaker for 1 hr. The viscosity of the mill base was measured using a TA Instruments Rheometer as the shear rate was increased from 37.6 to 2392.0 s$^{-1}$. The example dispersants 1 and 2 produced mill base viscosities under 2 Pa·s at a shear rate of 37.6 s−1 where as the comparative dispersant example A produced mill base viscosities over 6 Pa·s at the shear rate of 37.6 s−1.

The mill bases (1.93 parts) were let down into a solution of Macrynal SMC565 (2.94 parts ex UCB Chemicals) and Desmodur N3390 (0.33 parts, ex Bayer) in butyl acetate (0.85 parts) then drawn down onto black and, white card using a number 3 K-bar.

The coatings produced with example dispersants 1 and 2 produced glossy coatings which were transparent and contained few flocculated particles. The coating produced with the comparative dispersant example A was lower in gloss and produced a hazy coating with many flocculated particles.

| Dispersant | 60° Gloss of Coating | Haze value of coating | Visual transparency of coating | Flocculated particles in coating |
|---|---|---|---|---|
| Example 1 | 104.0 | 24.1 | Transparent | 6 |
| Example 2 | 96.7 | 21.5 | Transparent | 9 |
| Comparative Example A | 34.8 | 281 | Very Hazy | 50+ |

Gloss and haze were measured using a Byk-Gardner Haze Gloss meter. Transparency and the number of flocculated particles were assessed visually.

Intermediate C, Polycaprolactone-co-valerolactone

1-Dodecanol (114.6 parts), ε-caprolactone (666.73 parts) and δ-valerolactone (215.44 parts) were stirred together under nitrogen at 150° C. Zirconium butoxide catalyst (4 parts) was added and the reactants were heated to 180° C. and stirring maintained for 20 hours. After cooling to 20° C., the resulting polyester was obtained as a waxy solid. This is Intermediate C.

Example 3

Toluene diisocyanate (35.00 parts) and methoxy propyl acetate (64.99 parts) were stirred together in a RB flask and heated to 70° C. under nitrogen. Polypropylene glycol monobutyl ether (90.11 parts, Breox Lubricant B335 ex Cognis) and methoxy propyl acetate (100 parts) were then added over 45 minutes and the temperature maintained at 70° C. The reaction was cooled to 40° C. and 1,1'-{[3-(dimethylamino)-propyl]imino}bis-2-propanol (39.89 parts) was charged over 30 minutes maintaining the temperature at 40° C. The reaction mixture was then heated to 70° C. for 2 hrs until no isocyanate remained. Methoxy propyl acetate (220 parts) was then added to dilute the product to a solids content of 30%. 400 parts of the resulting solution were removed from the reaction vessel. The product was characterized by size exclusion chromatography and gave molecular weight values of Mn=5700 and Mw=14200. Benzyl chloride (3.78 parts) was charged to the residual solution (150 parts) which was held at 70° C. for 20 hrs with agitation to yield a quaternised PU dispersant. The final product had a solids content 32.4%.

Example 4

Intermediate A (poly(butyl methacrylate)) (51.35 parts, 50% solids), 1,1'-{[3-(dimethylamino)-propyl]imino}bis-2-propanol (17.91 parts) and methoxy propyl acetate (32.91 parts) were stirred together in a RB flask and heated to 70° C. under nitrogen. Toluene diisocyanate (15.00 parts) was then charged over 15 minutes and the temperature maintained at 70° C. for 2 hrs until no isocyanate remained. Ethylene glycol butyl ether (40 parts) and methoxy propyl acetate (37 parts) were then added to dilute the product to a solids content of 30%. 144.17 parts of the resulting solution were removed from the reaction vessel. The product was characterized by size exclusion chromatography and gave molecular weight values of Mn=1800 and Mw=8300. Benzyl chloride (0.66 parts) was charged to the residual solution (50 parts) which was held at 70° C. for 20 hrs with agitation to yield a quaternized PU (polyurethane) dispersant with solids content 32.82%.

Example 5

Intermediate C (poly(caprolactone-co-valerolactone)) (56 parts), 1,1'-{[3-(dimethylamino)-propyl]imino}bis-2-propanol (26.4 parts) and methoxy propyl acetate (100.48 parts) were stirred together in a RB flask and heated to 70° C. under nitrogen. Toluene diisocyanate (18.1 parts) was then charged over 15 minutes and the temperature maintained at 70° C. for 2 hrs until no isocyanate remained. 180 parts of the resulting solution were removed from the reaction vessel and the product was characterized by size exclusion chromatography and gave molecular weight values of Mn=1400 and Mw=4700. Benzyl chloride (1.22 parts) was charged to the residual solution (20 parts) which was held at 70° C. for 8 hrs with, agitation to yield a quaternized PU dispersant with solids content 56.27%.

Example 6

Intermediate A (poly(butyl methacrylate)) (136.59 parts, 50% solids), 1,1'-{[3-(dimethylamino)-propyl]imino}bis-2-propanol (23.82 parts), methoxy propyl acetate (53.82 parts) were stirred together in a RB flask and heated to 70° C. under nitrogen. Suprasec 2004 (30.00 parts, ex Huntsman) was then charged over 30 minutes and the temperature maintained at 70° C. for 2 hrs until no isocyanate remained. Ethylene glycol butyl ether (85 parts) and methoxy propyl acetate (77 parts) were then added to dilute the product. The resulting product had a solids content of 30%. 276 parts of the resulting solution were removed from the reaction vessel. The product was characterized by size exclusion chromatography and gave molecular weight values of Mn=3800 and Mw=8300. Benzyl chloride (1.98 parts) was charged to the residual solution (130 parts) which was held at 70° C. for 20 hrs with agitation to yield a quaternized PU (polyurethane) dispersant with solids content 31.0%.

Dispersion Testing

Dispersions were prepared by dissolving dispersants 3-6 (0.5 parts based on 100% active solution) in butyl acetate (7.0 parts). 3 mm Diameter glass beads (20 parts) and red pigment (2.0 parts, Cromopthal red A2B, ex Ciba) were added and the contents milled on a horizontal shaker for 16 hours. The resultant mill bases exhibited excellent fluidity where as the comparative example produced a thick immovable gel as described in the following table.

| Example | % Solids | Part Dispersant | Parts Butyl acetate | Parts Pigment | Fluidity |
|---|---|---|---|---|---|
| Comparative Example A | 42.8 | 1.17 | 6.83 | 2.0 | Immovable gel |
| 3 | 32.4 | 1.54 | 6.46 | 2.0 | Very Fluid |
| 4 | 32.8 | 1.52 | 6.48 | 2.0 | Very Fluid |
| 5 | 56.3 | 0.89 | 7.11 | 2.0 | Very Fluid |
| 6 | 31.0 | 1.61 | 7.39 | 2.0 | Very Fluid |

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements. As used herein, the expression "consisting essentially of" permits the inclusion of substances that do not materially affect the basic and novel characteristics of the composition under consideration.

While the invention has been explained in relation to its preferred embodiments, it is to be understood that various modifications thereof will, become apparent to those skilled in the art upon reading the specification. Therefore, it is to be understood that the invention disclosed herein is intended to cover such modifications as fall within the scope of the appended claims,

The invention claimed is:

1. A non-aqueous composition comprising a particulate solid, an organic medium and a polyurethane dispersant; said polyurethane dispersant comprising a) at least one essentially linear anchoring backbone segment including laterally attached to said essentially linear anchoring backbone segment tertiary and/or quaternized tertiary amine groups comprising one or more tertiary nitrogen atom wherein the tertiary nitrogen atom of said tertiary amine groups is separated from said backbone by at least one intervening atom and b) terminally attached to said anchoring backbone segment are one or more solvent-solubilising terminal chain(s) of a polyester, polyether, or polyacrylate, including mixtures of such terminal chains; wherein said essentially linear anchoring backbone segment is comprised of repeating units derived from an isocyanate component reacted with a tertiary and/or quaternized tertiary amine component, wherein said isocyanate component comprised reactive isocyanate groups having an average functionality of from about 2.0 to about 2.2 and said tertiary and/or quaternized tertiary amine component comprised groups reactive with isocyanate groups, wherein about 75 to about 95 mole % of the total of said reactive isocyanate groups of said isocyanate component were reacted with groups on said amine component that are reactive with isocyanate groups to form said anchoring backbone segment and wherein the total weight percentage of solvent-solubilising terminal chains is not less than 20% based on the total weight of polyurethane dispersant and said solvent-solubilizing terminal chains have a number average molecular weight of 500 to 5000 Dalton.

2. The composition of claim 1, wherein at least 20 mole % of the tertiary nitrogen atom of said tertiary amine groups are quaternized.

3. The composition of claim 1, wherein said one or more tertiary nitrogen atom is separated from said essentially linear backbone by 3 to 10 carbon atoms.

4. The composition of claim 1, wherein said solvent-solubilising terminal chain(s) comprise a polyether chain which comprises a poly($C_{2-4}$-alkylene oxide) containing less than 60% by weight ethylene oxide.

5. The composition of claim 1, wherein said solvent-solubilising terminal chain(s) comprise a polyester chain obtainable or obtained from polymerizing a hydroxy carboxylic acid or lactone thereof containing from 1 to 26 carbon atoms, including mixtures thereof.

6. The composition of claim 5, wherein the lactone comprises repeating units from least ε-caprolactone and/or δ-valerolactone.

7. The composition of claim 1, wherein the polyurethane dispersant comprises from about 1 to about 4 weight percent nitrogen atoms, in a tertiary amine group, separated by at least one atom from the essentially linear anchoring backbone segment based on the weight of the essentially linear anchoring backbone segment.

8. The composition of claim 1, wherein said polyurethane dispersant comprises more than one essentially linear anchoring backbone segments per molecule separated from each other by a solvent solubilising polyether, polyester, or polyacrylate chain.

9. The composition of claim 1 in the form of a) non-aqueous millbase, b) paint, or c) ink.

10. The composition of claim 9 further comprising film-forming resins.

11. The composition of claim 1, wherein the total weight percentage of solvent-solubilising terminal chains is not less than 30% and not more than 80% based on the total weight of polyurethane dispersant.

12. The composition of claim 11, wherein the total weight percentage of solvent-solubilising terminal chains is from 40 to 60% based on the total weight of polyurethane dispersant.

* * * * *